(12) United States Patent
Ahn et al.

(10) Patent No.: US 8,837,439 B2
(45) Date of Patent: Sep. 16, 2014

(54) METHOD AND APPARATUS OF TRANSMITTING CONTROL INFORMATION

(75) Inventors: Joon Kui Ahn, Anyang-si (KR); Jung Hoon Lee, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 612 days.

(21) Appl. No.: 13/133,315

(22) PCT Filed: Dec. 22, 2009

(86) PCT No.: PCT/KR2009/007672
§ 371 (c)(1),
(2), (4) Date: Jun. 7, 2011

(87) PCT Pub. No.: WO2010/074485
PCT Pub. Date: Jul. 1, 2010

(65) Prior Publication Data
US 2011/0235620 A1  Sep. 29, 2011

Related U.S. Application Data

(60) Provisional application No. 61/140,620, filed on Dec. 24, 2008.

(30) Foreign Application Priority Data

Dec. 4, 2009  (KR) ........................ 10-2009-0119745

(51) Int. Cl.
*H04J 3/00* (2006.01)
*H04W 56/00* (2009.01)
*H04L 1/00* (2006.01)

(52) U.S. Cl.
CPC ............ *H04W 56/00* (2013.01); *H04L 1/0027* (2013.01); *Y02B 60/50* (2013.01)
USPC ........................... 370/336; 375/267; 375/296

(58) Field of Classification Search
CPC ............................ H04L 5/0023; H04L 1/0027
USPC .................................................. 370/329, 336
See application file for complete search history.

(56) References Cited

U.S. PATENT DOCUMENTS

| 2007/0064666 | A1 | 3/2007 | Kwun et al. |
| 2009/0046569 | A1* | 2/2009 | Chen et al. .................... 370/203 |
| 2009/0190528 | A1* | 7/2009 | Chung et al. .................. 370/328 |
| 2010/0098012 | A1* | 4/2010 | Bala et al. ..................... 370/329 |

FOREIGN PATENT DOCUMENTS

| EP | 2 099 248 A2 | 9/2009 |
| KR | 10-2006-0055215 A | 5/2006 |
| WO | WO 2009/088225 A2 | 7/2009 |

OTHER PUBLICATIONS

LGE, "Correction to the UE behavior of PUCCH CQI piggybacked on PUSCH", 3GPP TSG-RAN1 Meeting #55, R1-084657, Nov. 10-14, 2008, 11 pages, XP050317886.

* cited by examiner

*Primary Examiner* — Mark Rinehart
*Assistant Examiner* — Matthew Hopkins
(74) *Attorney, Agent, or Firm* — Birch, Stewart, Kolasch & Birch, LLP

(57) ABSTRACT

A wireless communication system is disclosed herein. More specifically, a method of transmitting control information from a user equipment in a wireless communication system is disclosed, wherein the method includes receiving a first transmission timing information for transmitting a first control information associated with one or more first downlink component carriers from a base station; determining a second transmission timing information for transmitting a second control information associated with one or more second downlink component carrier by using the first transmission timing information and an additional transmission timing information; and transmitting control information on the one or more second downlink component carriers in dependence upon the second transmission timing information to the base station.

10 Claims, 14 Drawing Sheets

E-UMTS

Fig. 2
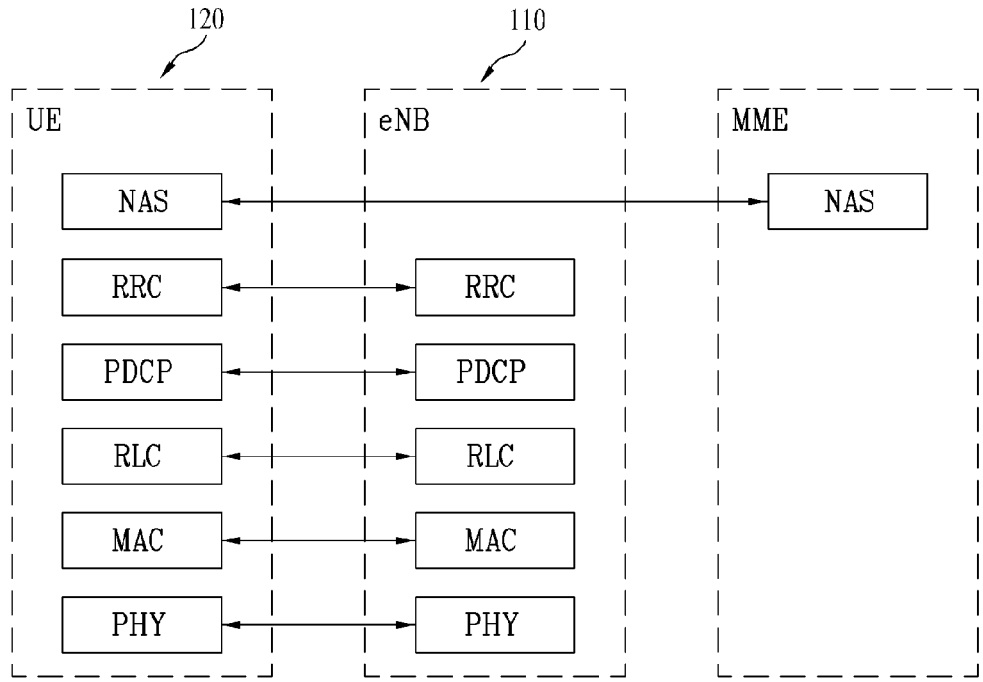
(a) Control-plane protocol stack
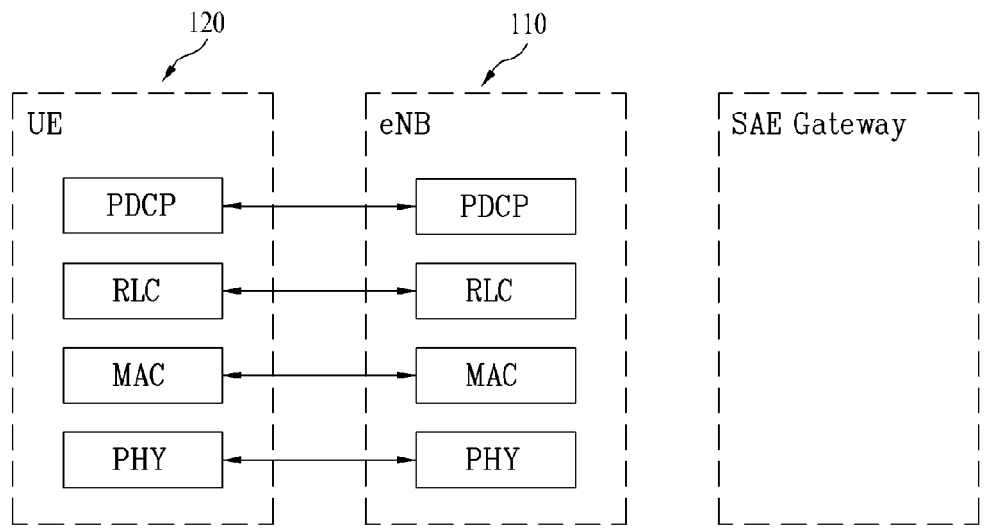
(b) User-plane protocol stack Single component carrier (e.g. LTE system)

Fig. 7
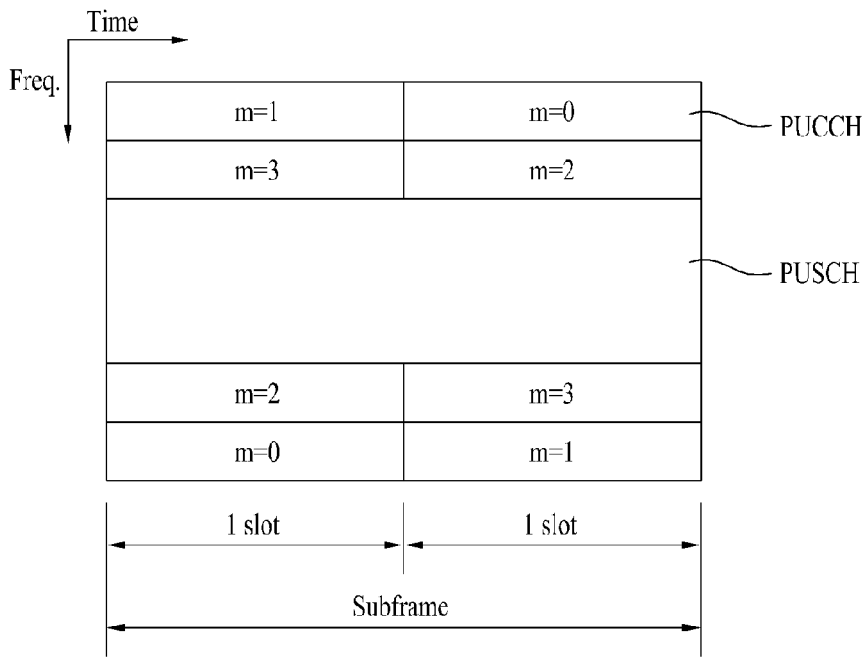
Fig. 8
| CQI reporting mode | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |
Fig. 9
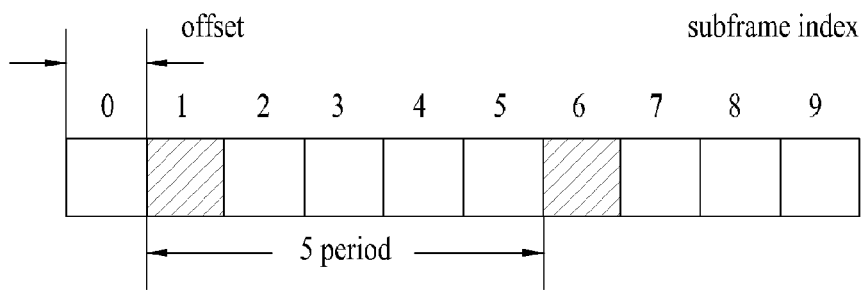

Fig. 10
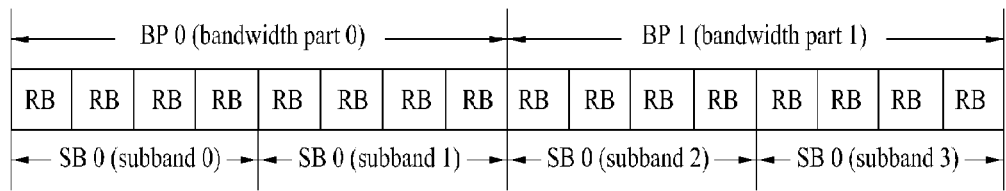
Fig. 11
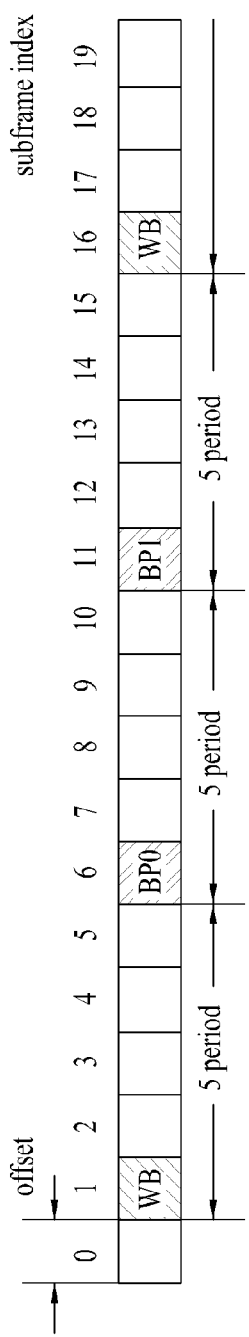
(a) Channel Quality Indicator (CQI) only
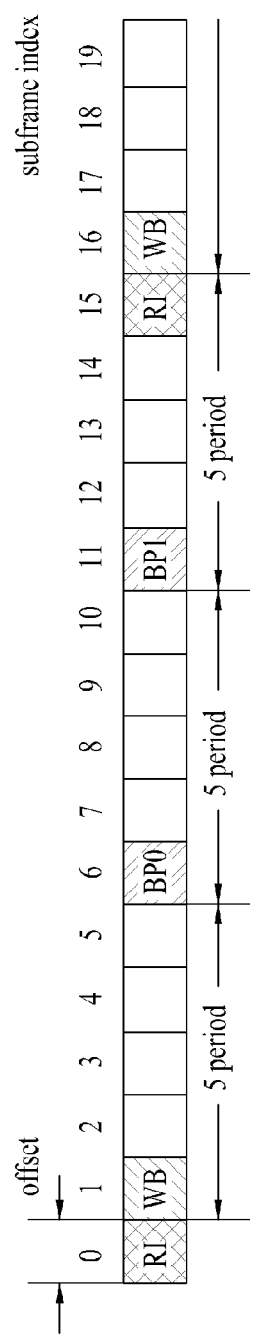
(b) CQI and Rank Indicator (RI)

Fig. 18
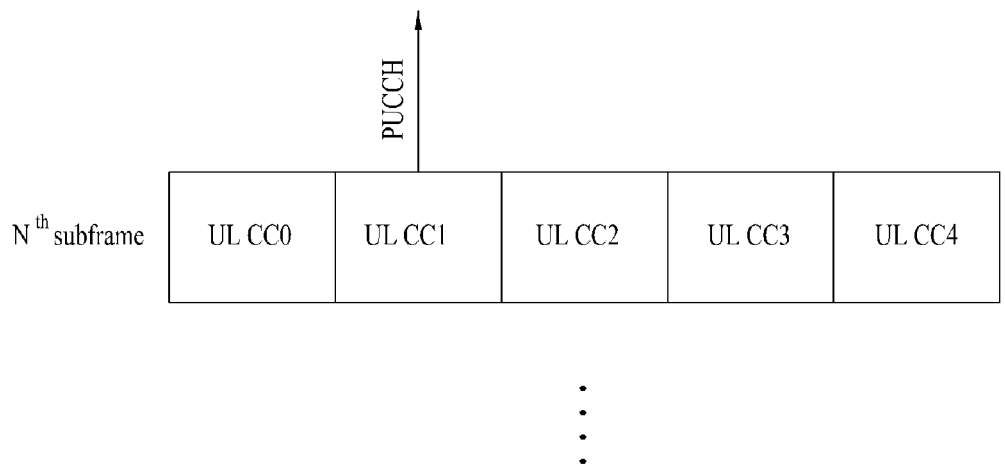
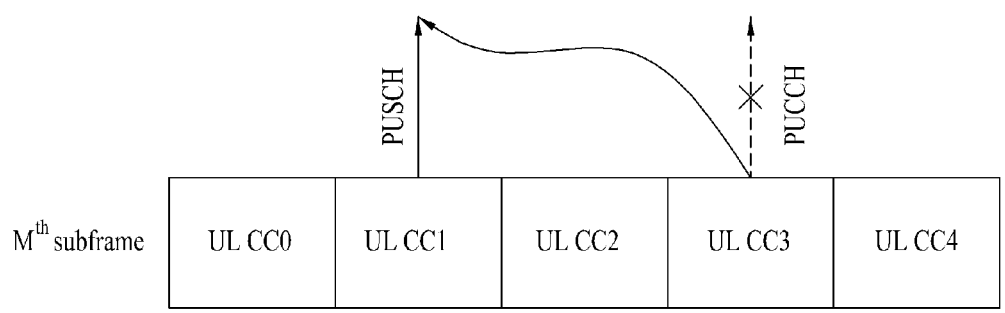
Fig. 19
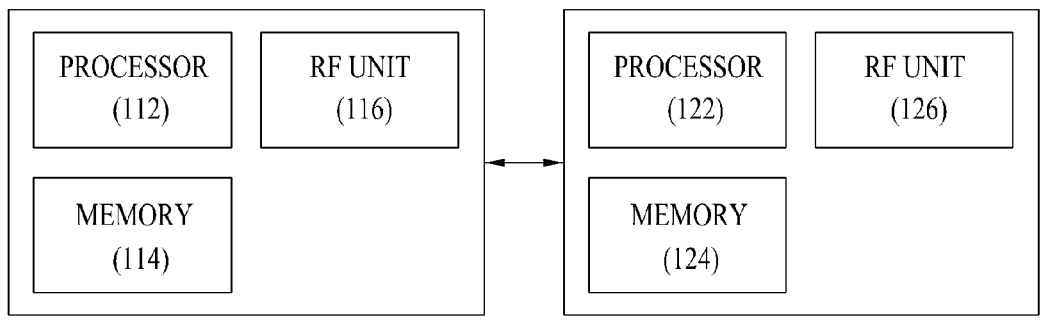

METHOD AND APPARATUS OF TRANSMITTING CONTROL INFORMATION

This application is a National Phase of PCT/KR2009/007672 filed on Dec. 22, 2009, which claims priority under 35 USC 119(e) to U.S. Provisional Application No. 61/140,620 filed Dec. 24, 2008 and under 35 USC 119(a) to Patent Application No. 10-2009-0119745 filed in Republic of Korea, on Dec. 4, 2009, all of which are hereby expressly incorporated by reference into the present application.

TECHNICAL FIELD

The present invention relates to a wireless communication system. And, more particularly, the present invention relates to a method and apparatus for reducing signaling overhead associated with control information and efficiently using power.

BACKGROUND ART

Wireless communication systems are being broadly developed in order to provide various types of communication services, such as voice or data services. Generally, a wireless communication system corresponds to a multiple access system that may support communication with multiple users by sharing an available system source (bandwidth, transmission power, etc.). Examples of a multiple access system include a CDMA (code division multiple access) system, an FDMA (frequency division multiple access) system, a TDMA (time division multiple access) system, an OFDMA (orthogonal frequency division multiple access) system, an SC-FDMA (single carrier frequency division multiple access) system, an MC-FDMA (multi carrier frequency division multiple access) system, and so on.

DISCLOSURE OF INVENTION

Technical Problem

An object of the present invention devised to solve the problem lies on providing a method and apparatus for reducing signaling overhead associated with control information in a wireless communication system. Another object of the present invention devised to solve the problem lies on providing a method and apparatus for efficiently controlling power that is used for transmitting the control information.

Technical Solution

In an aspect of the present invention, a method of transmitting control information from a user equipment (UE) in a wireless communication system includes receiving a first transmission timing information for transmitting a first control information associated with one or more first downlink component carriers from a base station; determining a second transmission timing information for transmitting a second control information associated with one or more second downlink component carriers by using the first transmission timing information and an additional transmission timing information; and transmitting control information on the one or more second downlink component carriers in dependence upon the second transmission timing information to the base station.

In another aspect of the present invention, a user equipment of a wireless communication system includes a radio frequency (RF) unit being configured to transmit and receive wireless signals to and from a base station; a memory storing information being transmitted and received to and from the base station and parameters required for performing operations of the user equipment; and a processor connected to the RF unit and the memory, and being configured to control the RF unit and the memory, so as to operate the user equipment, and wherein the processor performs a method for transmitting control information including receiving a first transmission timing information for transmitting a first control information associated with one or more first downlink component carriers from a base station; determining a second transmission timing information for transmitting a second control information associated with one or more second downlink component carriers by using the first transmission timing information and an additional transmission timing information; and transmitting control information on the one or more second downlink component carriers in dependence upon the second transmission timing information to the base station.

Herein, the first transmission timing information may include a period and an offset for transmitting channel information on the one or more first downlink component carrier.

Herein, the second transmission timing information may be determined by modifying at least one of a period and an offset included in the first transmission timing information based upon the additional transmission timing information.

Herein, the additional transmission timing information may indicate a relative value for a specific parameter or an absolute value for the specific parameter, among a plurality of parameters configuring the first transmission timing information. And, the additional transmission timing information may be obtained by using a parameter associated with the one or more second downlink component carriers.

Herein, the second transmission timing information may be determined so that the first control information and the second control information are prevented from being transmitted simultaneously.

Herein, the first control information and the second control information may be transmitted to the base station through the same uplink component carrier.

Advantageous Effects

According to the embodiments of the present invention, signaling overhead associated with control information in a wireless communication system may be reduced. Also, the power that is used for transmitting control information may be efficiently controlled.

It is to be understood that technical problems to be solved by the present invention are not limited to the aforementioned technical problems and other technical problems which are not mentioned will be apparent from the following description to the person with an ordinary skill in the art to which the present invention pertains.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram illustrating structures of a radio interface protocol between a user equipment and E-UTRAN based on the 3GPP radio access network standard;

FIG. 7 illustrates an exemplary structure of an uplink subframe used in the LTE;

FIG. 8 to FIG. 11 illustrate examples of periodic reporting of channel information;

FIG. 18 illustrates an example of transmitting control information according to an embodiment of the present invention; and FIG. 19 illustrates exemplary base station and user equipment that can be applied to the embodiment of the present invention.

MODE FOR THE INVENTION

The structure, application, and other characteristics of the present invention may be understood by the foregoing general description and the following detailed description of the embodiments of the present invention with reference to the following drawings. Herein, the embodiments of the present invention may be applied in diverse wireless (or radio) access technologies, such as CDMA, FDMA, TDMA, OFDMA, SC-FDMA, and MC-FDMA. The CDMA may be embodied with wireless technology such as UTRA (Universal Terrestrial Radio Access) or CDMA2000. The TDMA may be embodied with wireless technology such as GSM (Global System for Mobile communications)/GPRS (General Packet Radio Service)/EDGE (Enhanced Data Rates for GSM Evolution). The OFDMA may be embodied with wireless technology such as IEEE 802.11 (Wi-Fi), IEEE 802.16 (WiMAX), IEEE 802.20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The LTE-A (Advanced) is an evolved version of the 3GPP LTE.

The following embodiments of the present invention mainly describe examples of the technical characteristics of the present invention being applied to the 3GPP system. However, this is merely exemplary. Therefore, the present invention will not be limited only to the embodiments of the present invention described herein.

Figure 1:
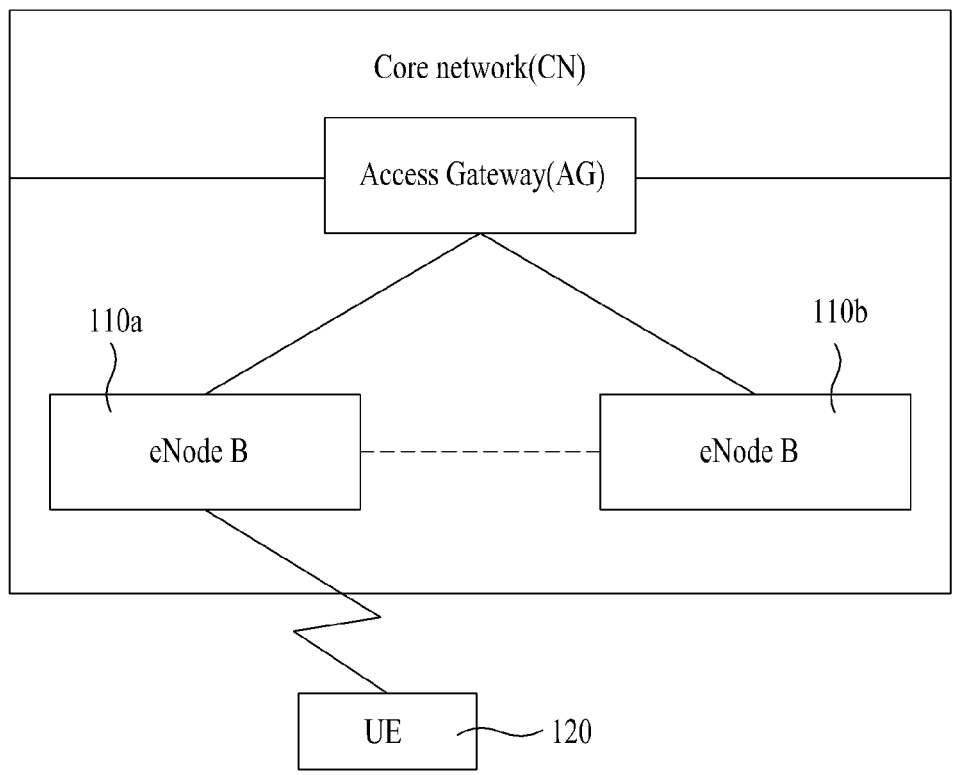
FIG. 1 is a diagram illustrating a network structure of an Evolved Universal Mobile Telecommunications System (E-UMTS)

FIG. 1 is a diagram illustrating a network structure of an Evolved Universal Mobile Telecommunications System (E-UMTS). The E-UMTS may also be referred to as a Long Term Evolution (LTE) system. For details of the technical specifications of the UMTS and the E-UMTS, refer to Release 7 and Release 8 of "3rd Generation Partnership Project; Technical Specification Group Radio Access Network".

Referring to FIG. 1, the E-UMTS includes a User Equipment (UE) 120, base stations (eNode B and eNB) 110$a$ and 110$b$, and an Access Gateway (AG) which is located at an end of a network (E-UTRAN) and connected to an external network. The base stations can simultaneously transmit multiple data streams for a broadcast service, a multicast service and/or a unicast service. One or more cells may exist for one base station. One cell is set to one of bandwidths of 1.25, 2.5, 5, 10, and 20 Mhz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify information related to time and frequency domains to which data will be transmitted, encoding, data size, and hybrid automatic repeat and request (HARM). Also, the base station transmits uplink (UL) scheduling information of uplink data to the corresponding user equipment to notify information related to time and frequency domains that can be used by the corresponding user equipment, encoding, data size, and HARQ. An interface for transmitting user traffic or control traffic can be used between the base stations. A Core Network (CN) may include the AG and a network node or the like for user registration of the UE. The AG manages mobility of a UE on a Tracking Area (TA) basis, wherein one TA includes a plurality of cells.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used in the user equipment and the network to manage call. The user plane means a passageway where data generated in an application layer, for example, voice data or Internet packet data, are transmitted.

A physical layer as a first layer provides an information transfer service to an upper layer using a physical channel. The physical layer is connected to a medium access control layer above the physical layer via a transport channel. Data are transferred between the medium access control layer and the physical layer via the transport channel. Data are transferred between one physical layer of a transmitting side and the other physical layer of a receiving side via the physical channel. The physical channel uses time and frequency as radio resources. Specifically, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control layer of a second layer provides a service to a radio link control (RLC) layer above the MAC layer via a logical channel. The RLC layer of the second layer supports reliable data transfer. The RLC layer may be implemented as a functional block inside the MAC layer. In order to effectively transmit IP packets such as IPv4 or IPv6 within a radio interface having a narrow bandwidth, a packet data convergence protocol (PDCP) layer of the second layer performs header compression to reduce the size of unnecessary control information.

A radio resource control (hereinafter, abbreviated as 'RRC') layer located on a lowest part of a third layer is defined in the control plane only. The RRC layer is associated with configuration, re-configuration and release of radio bearers (hereinafter, abbreviated as 'RBs') to be in charge of controlling the logical, transport and physical channels. In this case, the RB means a service provided by the second layer for the data transfer between the user equipment and the network. To this end, the RRC layers of the user equipment and the network exchange RRC messages with each other. If the RRC layer of the user equipment is RRC connected with the RRC layer of the network, the user equipment is in RRC connected mode. If not so, the user equipment is in RRC idle mode. A non-access stratum (NAS) layer located above the RRC layer performs functions such as session management and mobility management.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
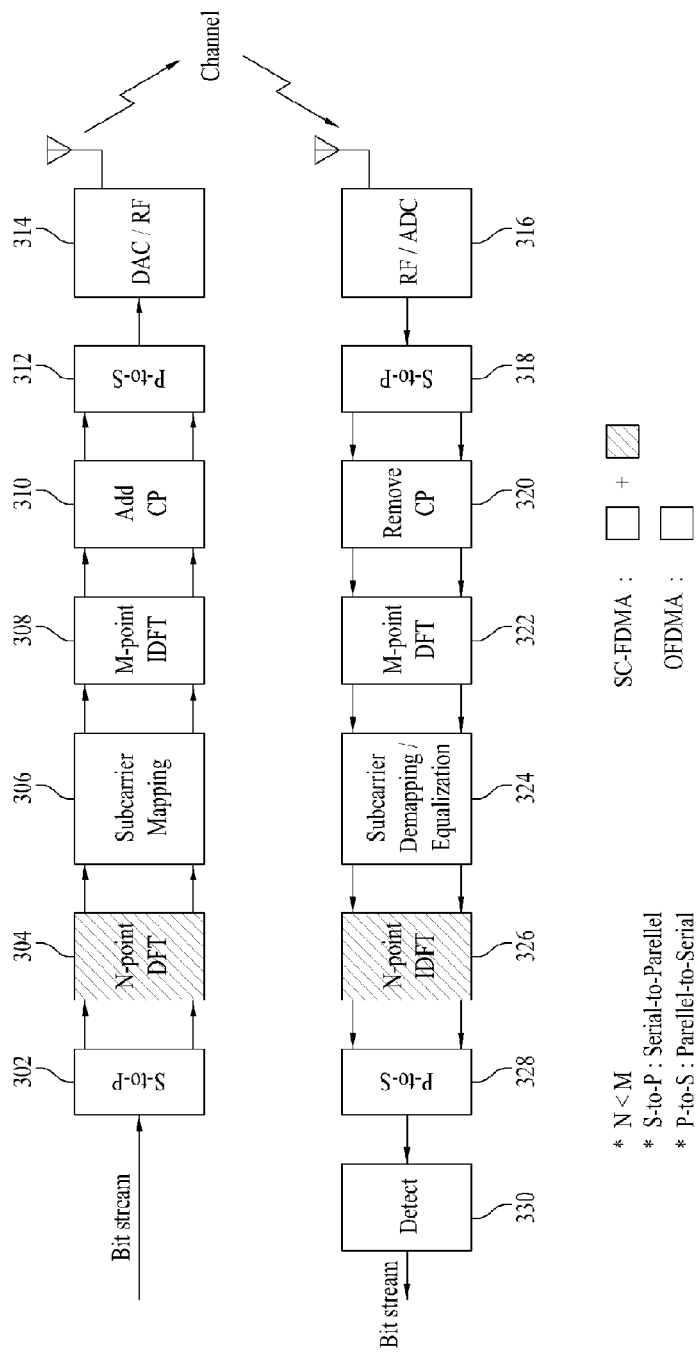
FIG. 3 is a block diagram illustrating a transmitter and a receiver for OFDMA and SC-FDMA.

FIG. 3 is a block diagram illustrating a transmitter and a receiver for OFDMA and SC-FDMA. In the uplink, transmitters 302 to 314 are parts of the user equipment, and receivers 316 to 330 are parts of the base station. In the downlink, the transmitters are parts of the base station, and the receivers are parts of the user equipment.

Referring to FIG. 3, an OFDMA transmitter includes a serial to parallel converter 302, a sub-carrier mapping module 306, an M-point inverse discrete fourier transform (IDFT) module 308, a cyclic prefix (CP) addition module 310, a parallel to serial converter 312, and a radio frequency (RF)/digital to analog converter (DAC) module 314.

A signal processing procedure in the OFDMA transmitter will be described below. First of all, bit streams are modulated to data symbol sequences. The bit streams can be obtained by performing various signal processes, such as channel encoding, interleaving and scrambling, for a data block transferred from the MAC layer. The bit streams may be designated as codewords, and are equivalent to the data block transferred from the MAC layer. The data block transferred from the MAC layer may be designated as a transmission block. Examples of a modulation scheme include, but not limited to, BPSK (binary phase shift keying), QPSK (quadrature phase shift keying), and n-QAM (quadrature amplitude modulation). The data symbol sequences in series are converted to parallel data symbol sequences as much as N (302). N number of data symbols are mapped with N number of subcarriers allocated among a total of M number of subcarriers, and the other M-N number of carriers are padded with 0 (306). The data symbols mapped in a frequency domain are converted to time region sequences through M-point IDFT processing (S308). Afterwards, in order to reduce inter-symbol interference (ISI) and inter-carrier interference (ICI), cyclic prefix is added to the time region sequences to generate OFDMA symbols (310). The generated OFDMA symbols are converted from parallel symbols to serial symbols (312). Then, the OFDMA symbols are transmitted to the receiver through digital-to-analog conversion and frequency uplink conversion (314). Other user is allocated with available subcarriers among the remaining M-N number of subcarriers. On the other hand, the OFDMA receiver includes an RF/ADC (analog to digital converter) module 316, a discrete fourier transform (DFT) module 322, a subcarrier demapping/equalization module 324, a parallel-to-digital converter 328, and a detection module 330. A signal processing procedure of the OFDMA receiver will be configured in reverse order of the OFDMA transmitter.

Meanwhile, as compared with the OFDMA transmitter, the SC-FDMA transmitter additionally includes an N-point DFT module 304 prior to the subcarrier mapping module 306. The SC-FDMA transmitter can reduce a peak-to-average power ratio (PAPR) of a transmitting signal more remarkably than the OFDMA transmitter by spreading a plurality of data to the frequency domain through DFT prior IDFT processing. Also, as compared with the OFDMA receiver, the SC-FDMA receiver additionally includes an N-point IDFT module 326 after the subcarrier demapping module 324. A signal processing procedure of the SC-FDMA receiver will be configured in reverse order of the SC-FDMA transmitter.

Figure 4:
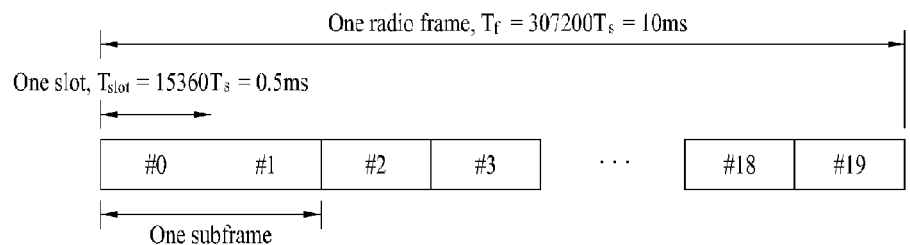
FIG. 4 is a diagram illustrating a structure of a radio frame used in an LTE system.

The modules illustrated in FIG. 4 are illustrative, and the transmitter and/or the receiver may further include necessary modules. Some modules/functions may be omitted or may be divided into different modules, and two or more modules may be incorporated into one module. A structure of a radio frame will now be described.

FIG. 4 is a diagram illustrating a structure of a radio frame used in the LTE system.

Referring to FIG. 4, the radio frame has a length of 10 ms ($327200 \cdot T_s$) and includes 10 subframes of an equal size. Each sub frame has a length of 1 ms and includes two slots. Each slot has a length of 0.5 ms ($15360 \cdot T_s$). In this case, $T_s$ represents a sampling time, and is expressed by $T_s=1/(15 \text{ kHz} \times 2048)=3.2552 \times 10^{-8}$ (about 33 ns). The slot includes a plurality of OFDM symbols in a time domain, and includes a plurality of resource blocks (RBs) in a frequency domain. In the LTE system, one resource block includes twelve (12) subcarriers×seven (or six) OFDM symbols. A transmission time interval (TTI) which is a transmission unit time of data can be determined in a unit of one or more subframes. The aforementioned structure of the radio frame is only exemplary, and various modifications can be made in the number of subframes included in the radio frame or the number of slots included in the subframe, or the number of OFDM symbols included in the slot.

Figure 5:
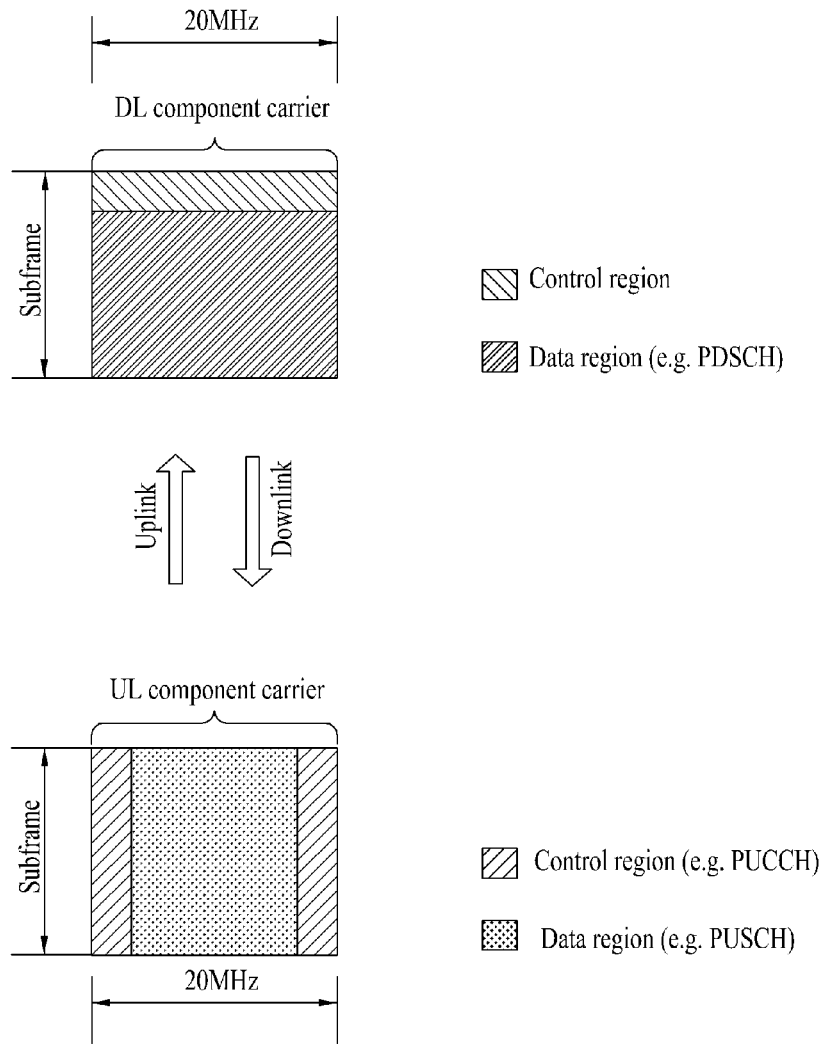
FIG. 5 is a diagram illustrating an example of communication under a single component carrier.

FIG. 5 illustrates an example of a communication process being performed in a single component carrier condition. FIG. 5 may correspond to an example of a communication process in an LTE system.

Referring to FIG. 5, a general FDD-type wireless communication system performs data transmission and/or reception through a downlink band and an uplink band respective to the downlink band. The base station and user equipment transmits and/or receives data and/or control information scheduled in subframe units. Herein, the data are transmitted and/or received through a data region in the up-/downlink subframe, and the control information is transmitted and/or received through a control region in the up-/downlink subframe. For this, the up-/downlink subframe delivers signals through a plurality of physical channels. Signal transmission using physical channels will be described in more detail with reference to FIG. 6. FIG. 5 mainly describes the FDD mode for simplicity. However, the above-described detail may also be applied in the TDD mode, by differentiating the radio frame of FIG. 4 into up-/downlink portions in the time domain.

Figure 6:
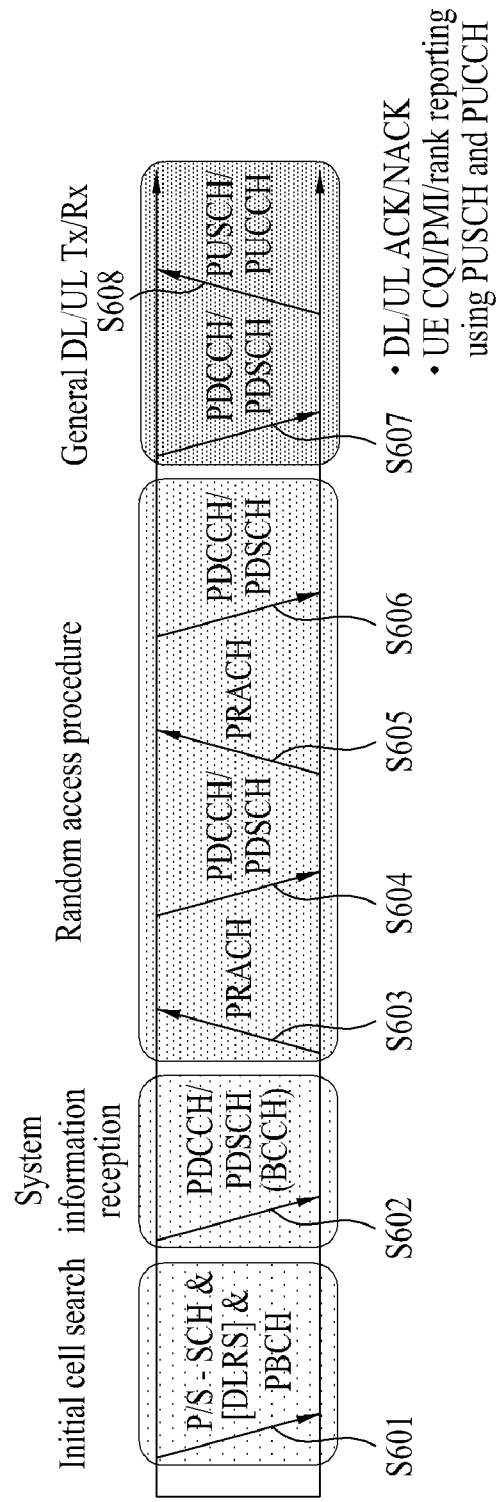
FIG. 6 is a diagram illustrating physical channels used in a 3GPP system and a method for transmitting a general signal using the physical channels.

FIG. 6 is a diagram illustrating physical channels used in a LTE system and a method for transmitting a general signal using the physical channel.

The user equipment performs initial cell search such as synchronizing with the base station when it newly enters a cell or the power is turned on (S601). To this end, the user equipment synchronizes with the base station by receiving a primary synchronization channel (P-SCH) and a secondary synchronization channel (S-SCH) from the base station, and acquires information of cell ID, etc. Afterwards, the user equipment can acquire broadcast information within the cell by receiving a physical broadcast channel from the base station.

The user equipment which has finished the initial cell search can acquire more detailed system information by receiving a physical downlink control channel (PDSCH) in accordance with a physical downlink control channel (PDCCH) and information carried in the PDCCH (S602).

Meanwhile, if the user equipment initially accesses the base station, or if there is no radio resource for signal transmission, the user equipment performs a random access procedure (RACH) for the base station (S603 to S606). To this end, the user equipment transmits a specific sequence to a preamble through a physical random access channel (PRACH) (S603 and S605), and receives a response message to the preamble through the PDCCH and a PDSCH corresponding to the PDCCH (S604 and S606). In case of a contention based RACH, a contention resolution procedure can be performed additionally.

The user equipment which has performed the aforementioned steps receives the PDCCH/PDSCH (S607) and transmits a physical uplink shared channel (PUSCH) and a physical uplink control channel (PUCCH) (S608), as a procedure of transmitting general uplink/downlink signals. The control information transmitted from the user equipment to the base station or received from the base station to the user equipment through the uplink includes downlink/uplink ACK/NACK signals, a channel quality indicator (CQI), a precoding matrix index (PMI), and a rank indicator (RI). In case of the 3GPP LTE system, the user equipment transmits control information of the aforementioned CQI/PMI/RI through the PUSCH and/or the PUCCH.

FIG. 7 illustrates an exemplary structure of an uplink subframe used in the LTE.

Referring to FIG. 7, an uplink subframe includes multiple slots (e.g., two (2) slots). Each slot may include different numbers of SC-FDMA symbols depending upon a CP length. For example, in case of a normal CP, a slot may include seven (7) SC-FDMA symbols. The uplink subframe is divided into a data region and a control region. The data region includes an uplink shared channel (PUSCH) used for transmitting data signals, such as voice (or sound), image, and so on. The control region includes an uplink control channel (PUCCH) used for transmitting control information. The PUCCH includes an RB pair located at each end of the data region in a frequency axis and hops at a slot boundary. The control information includes HARQ ACK/NACK and channel information on the downlink (hereinafter referred to as downlink channel information or channel information). The downlink channel information includes CQI, PMI, RI, and so on. The base station uses the downlink channel information received from each user equipment, so as to decide time/frequency source, modulation methods, coding rates, and so on appropriate for transmitting data to each user equipment.

In the LTE system, the channel information includes CQI, PMI, RI, and so on. And, depending upon the transmission mode of each user equipment, all or only a portion of the CQI, PMI, RI, and so on, is transmitted. A case where the channel information is periodically transmitted is referred to as periodic reporting, and a case where the channel information is transmitted only upon request from the base station is referred to as aperiodic reporting. In case of the aperiodic reporting, a request bit, which is included in the uplink scheduling information sent from the base station, is transmitted to the user equipment. Thereafter, the user equipment delivers channel information, wherein its own transmission mode is taken into consideration, to the base station through an uplink data channel (PUSCH). In case of the periodic reporting, a period and an offset in the corresponding period are signaled in subframe units to each user equipment using a semi-static method through an upper layer signal. Each user equipment delivers channel information considering its respective transmission mode to the base station through the uplink control channel (PUCCH) based upon a pre-decided period. If uplink data coexist in the subframe transmitting the channel information, the channel information is transmitted through the uplink data channel (PUSCH) along with the data. The base station transmits transmission timing information appropriate for each user equipment, while taking into consideration the channel condition of each user equipment and a user equipment dispersion (or distribution) status within a cell. The transmission timing information includes a period and an offset which are used for transmitting channel information. And, the transmission timing information may be delivered to each user equipment through an RRC message.

FIG. 8 to FIG. 11 illustrate examples of periodic reporting of channel information.

Referring to FIG. 8, four (4) types of CQI reporting modes exist in the LTE system. More specifically, based upon a CQI feedback type, the CQI reporting mode is divided into a WideB and (WB) CQI and a SubBand (SB) CQI, and based upon a PMI transmission status, the CQI reporting mode is also divided into a No PMI and a single PMI. In order to periodically report the CQI, each user equipment receives information configured of a combination of a period and an offset via RRC signaling.

FIG. 9 illustrates an example of transmitting channel information when the user equipment is signaled with an information indicating {period '5', offset '1'}. Referring to FIG. 9, when receiving information indicating that the period is '5' and that the offset is '1', the user equipment transmits channel information in five (5) subframe units starting from a 0th subframe in an increasing direction of the subframe index with the offset of one (1) subframe. The channel information is basically transmitted through the PUCCH. However, if a PUSCH exists, wherein the PUSCH is used for transmitting data at the same point (or position) as the PUCCH, the channel information is transmitted through the PUSCH along with the data. The subframe index is configured of a combination of a system frame number ($n_f$) and a slot index ($n_s$, 0~19). Since the subframe consists of two (2) slots, the subframe index may be defined as $10*n_f+\text{floor}(n_s/2)$. Herein, the floor( ) indicates a floor function.

A type transmitting only the WB CQI and a type transmitting both WB CQI and SB CQI exist. The type transmitting only the WB CQI transmits CQI information respective to the overall band in a subframe corresponding to each CQI transmission period. Meanwhile, when PMI is also to be transmitted depending upon the PMI feedback type, as shown in FIG. 8, the PMI information is transmitted along with the CQI information. And, the type transmitting both WB CQI and SB CQI alternately transmits the WB CQI and the SB CQI.

FIG. 10 illustrates an example of a system having a system band configured of sixteen (16) RBs. In this case, it is assumed that the system band consists of two (2) BPs (Bandwidth Parts), that each BP is configured of two (2) SBs (subbands) (SB0, SB1), and that each SB consists of four (4) RBs. The above-mentioned assumption is merely exemplary, and, therefore, the number of BPs and the size of the SBs may vary depending upon the size of the system band. Also, the number of SBs configuring each BP may also vary depending upon the number of RBs, the number of BPs and the size of the SBs.

In case of the type transmitting both WB CQI and SB CQI, WB CQI is transmitted from a first CQI transmission subframe. Then, from a next CQI transmission subframe, CQI respective to a SB having the better channel condition between SB0 and SB1 of BP0 and an index of the corresponding SB are transmitted. Thereafter, from a further next CQI transmission subframe, CQI respective to a SB having the better channel condition between SB0 and SB1 of BP1 and an index of the corresponding SB are transmitted. As described above, after transmitting the WB CQI, CQI information respective to each BP is sequentially transmitted. CQI information respective to each BP may be sequentially transmitted 1-4 times between two WB CQIs. For example, when CQI information respective to each BP are sequentially transmitted one (1) time between two WB CQIs, transmission may be performed in the order of WB CQI=>BP0 CQI=>BP1 CQI=>WB CQI. Also, when CQI information respective to each BP are sequentially transmitted four (4) times between two WB CQIs, transmission may be performed in the order of WB CQI=>BP0 CQI=>BP1 CQI=>BP0 CQI=>BP1 CQI=>BP0 CQI=>BP1 CQI=>BP0 CQI=>BP1 CQI=>WB CQI. Information on how many times each BP CQI is to be transmitted is signaled from an upper layer (e.g., RRC layer).

FIG. 11($a$) illustrates an example of transmitting both WB CQI and SB CQI when the user equipment is signaled with an information indicating {period '5', offset '1'}. Referring to FIG. 11($a$), regardless of its type, the CQI may only be transmitted in a subframe corresponding to the signaled period and offset. FIG. 11($b$) illustrates an example of an RI being transmitted in addition to the example shown in FIG. 11($a$). As for RI, a combination of multiples of WB CQI transmission period by which the RI is being transmitted and an offset of the corresponding period, may be signaled from an upper layer (e.g., RRC layer). The offset of RI is signaled using a relative value respective to the offset of CQI. For example, if the CQI offset is '1', and if the RI offset is '0', the RI has the same offset as the CQI. The offset value of the RI is defined as 0 and a negative number. More specifically, it is assumed that in FIG. 11($b$), in an environment identical to that of FIG. 11($a$), the RI transmission period is a one (1) time multiple of the WB CQI transmission period, and that the RI offset is '−1'. Since the RS transmission cycle is a one (1) time multiple of the WB CQI transmission period, the channel information transmission period is substantially the same. Since the offset of the RI is '−1', the RI is transmitted based upon the value '−1' (i.e., subframe #0) respective to the CQI offset '1'. If the RI offset is '0', the transmission subframe of the WB CQI and the RI may overlap. Therefore, in this case, the WB CQI is dropped, and the RI is transmitted.

Meanwhile, in order to use a broader (or wider) frequency band, the LTE-A system uses a carrier aggregation (or bandwidth aggregation) technology, which gathers multiple up-/downlink frequency blocks so as to use a larger up-/downlink bandwidth. Each frequency block is transmitted by using a component carrier (CC). In the description of the present invention, depending upon the context, the component carrier (CC) may represent a frequency block for carrier aggregation or a center carrier of the frequency block, and such definitions may be alternately used herein.

Figure 12:
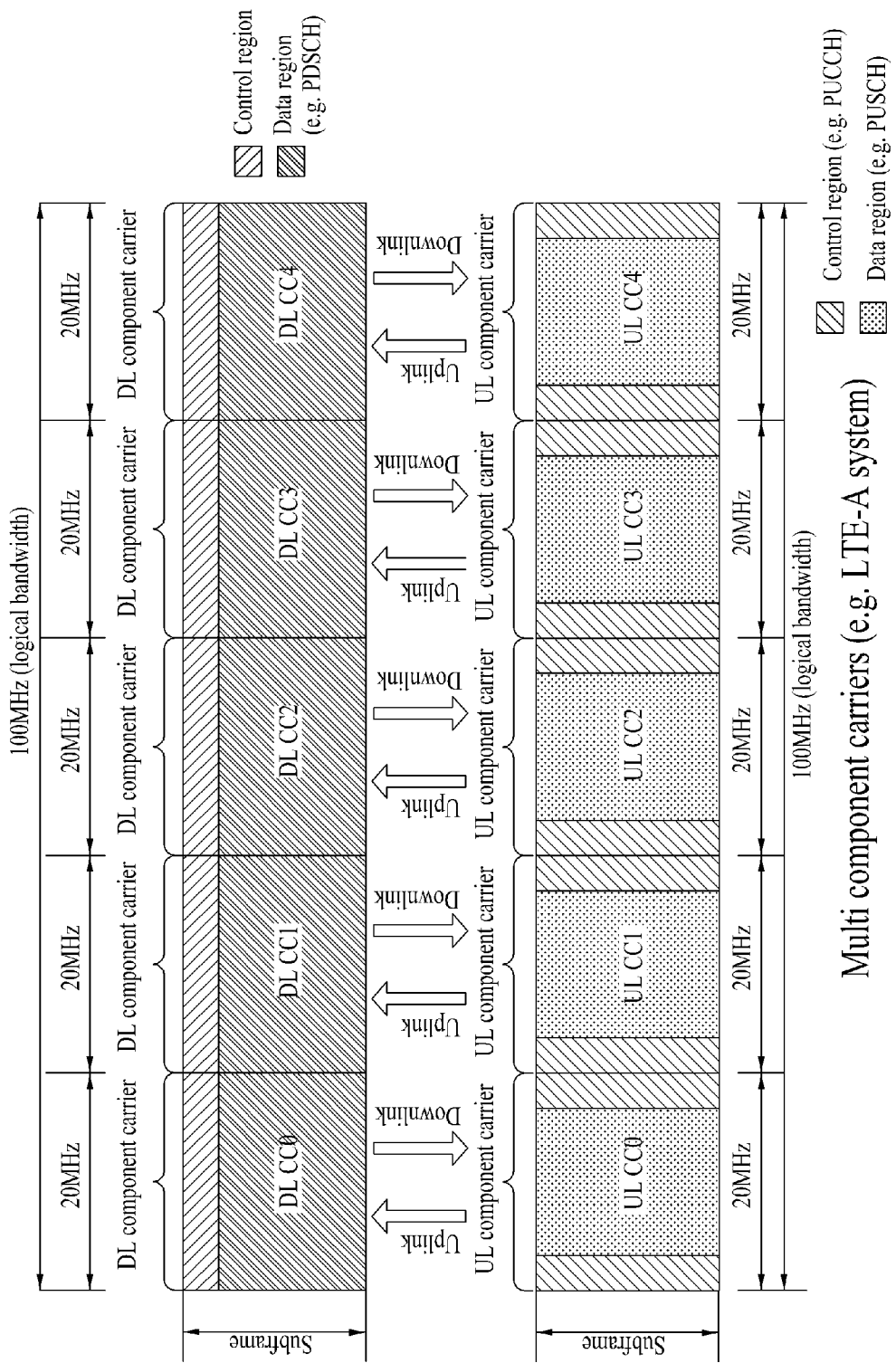
FIG. 12 is a diagram illustrating an example of communication under a plurality of component carriers.

FIG. 12 illustrates an example of performing communication under a multiple component carrier situation. Referring to FIG. 12, five (5) 20 MHz CCs may be gathered in each of the uplink and downlink, so as to support a 100 MHz bandwidth. Each of the CCs may be adjacent or non-adjacent to one another in the frequency domain. For simplicity, FIG. 12 illustrates a case where the bandwidth of an uplink component carrier and the bandwidth of a downlink component carrier are both identical and symmetrical to one another. However, the bandwidth of each component carrier may be independently decided. For example, the bandwidth of the uplink component carrier may be configured as 5 MHz (UL CC0)+20 MHz (UL CC1)+20 MHz (UL CC2)+20 MHz (UL CC3)+5 MHz (UL CC4). Also, an asymmetrical carrier aggregation, wherein the number of uplink component carriers and the number of downlink component carriers are different from one another, may also be performed. The asymmetrical carrier aggregation may be caused by a limit in available frequency bands or artificially created by network settings. For example, even if the overall system band is configured of N number of CCs, the frequency band that can be received by one specific user equipment may be limited to M(<N) number of CCs. Various parameters respective to the carrier aggregation may be set by cell-specific, UE group-specific, or UE specific methods. Although FIG. 12 illustrates an example of an uplink signal and a downlink signal being transmitted through a component carrier mapped in a one-to-one correspondence, the component carrier through which the signals are actually transmitted may vary depending upon the network settings or the signal type. For example, when a scheduling command is downlink transmitted through a DL CC1, the transmission and/or reception of the data according to the scheduling method may be performed through another DL CC. Also, control information associated with the DL CC (group) may be uplink transmitted through a specific UL CC (group) regardless of the mapping status. Similarly, downlink control information may also be transmitted through a specific DL CC (group).

Meanwhile, when information on control information transmission timing is provided to the user equipment for each CC (group), signaling should be separately performed to the same terminal for each CC (group). Therefore, the overhead for signaling increases in proportion to the number of CCs or CC groups. Therefore, it is proposed in the present invention that only one value for the control information transmission timing is notified, and the control information transmission timing for each CC (group) is identified by using the value for the control information transmission timing.

Also, if a period or an offset is not particularly taken into consideration with respect to the control information transmission timing for each CC, control information of multiple CCs may be simultaneously transmitted in uplink. More specifically, control information of multiple CCs may be simultaneously uplink transmitted through multiple PUCCHs. In this case, since the single carrier characteristic is not longer valid, PAPR (Peak to Average Power Ratio) and CM (Cubic Metric) characteristics of an uplink signal may be deteriorated. In case of an LTE-A user equipment, such problems may be resolved by using a high power amp. However, even when using an LTE-A user equipment, power problems may occur depending upon specific situations (e.g., when positioned at cell boundary). Thus, the single carrier characteristic of the transmission signal may be required to be maintained. Also, due to network settings or other reasons, settings may be made to maintain the single carrier characteristic. Accordingly, the present invention proposes a method of differently adjusting the timing for transmitting control information for each CC, so that only one control information may be transmitted in the corresponding subframe.

Figure 13:
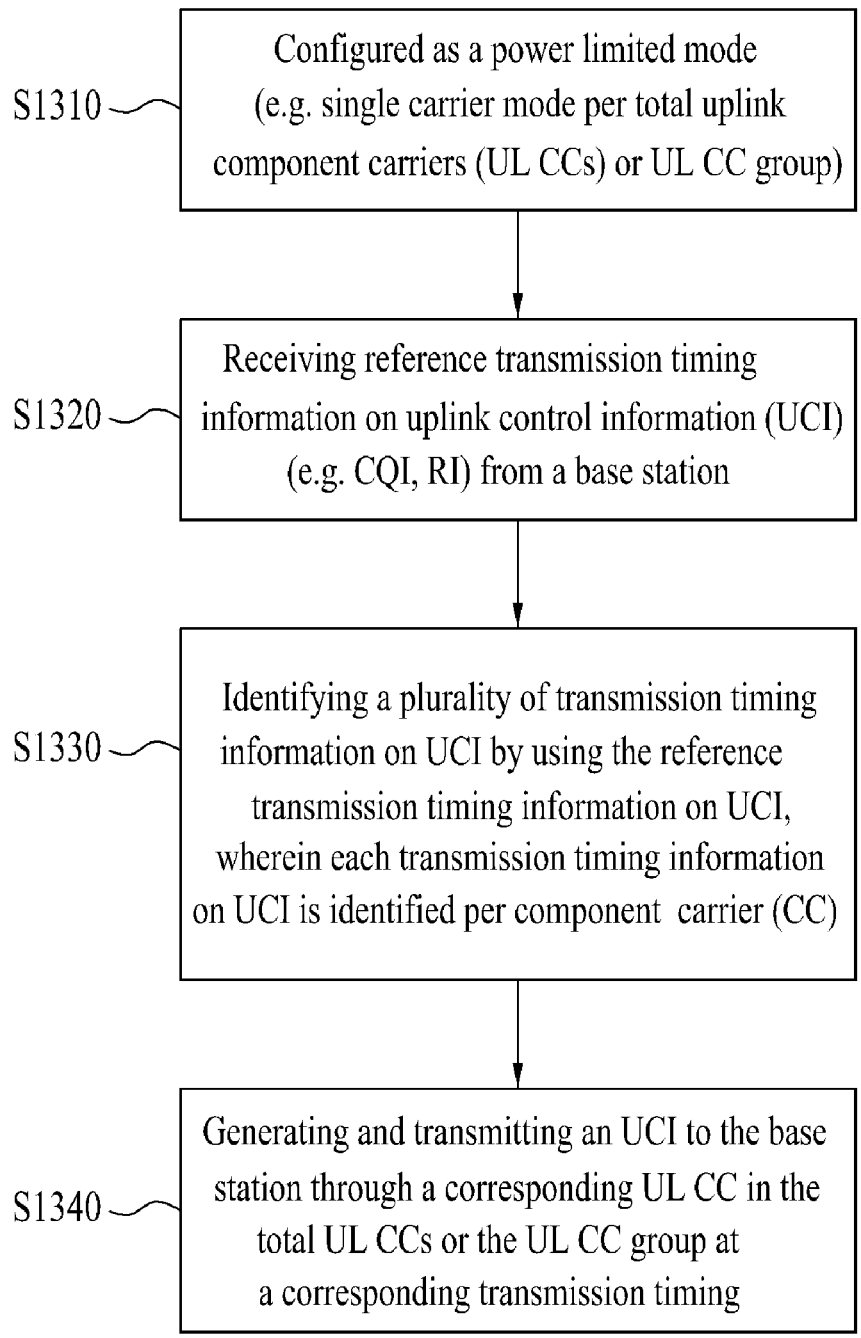
FIG. 13 illustrates a flow chart for transmitting control information according to an embodiment of the present invention.

FIG. 13 illustrates a flow chart showing the transmission of control information according to an embodiment of the present invention.

Referring to FIG. 13, due to its ability or other reasons, a user equipment may be set to a lower limited mode (S1310). For example, as it moves to the cell boundary, the user equipment may be set to the power limited mode. The power limited mode may require transmission of a signal having a single carrier characteristic within respect to the overall UL CC or a UL CC group (single carrier mode). More specifically, in the corresponding UL CCs, the simultaneous transmission of multiple physical channels (e.g., PUSCH, PUCCH) may be limited. Information on the power mode may be delivered to the user equipment through an RRC message or a downlink physical channel (e.g., PDCCH). If the power of the user equipment is not limited, step 1310 may be omitted.

In this condition, the user equipment may receive reference transmission timing information with respect to an Uplink Control Information (UCI) of a downlink component carrier or a downlink component carrier group from the base station (S1320). The downlink component carrier group includes one or more component carriers. The uplink control information may include downlink channel information, such as CQI, PMI, RI, and so on. The reference transmission timing information includes at least one parameter required for transmitting the UCI. For example, the reference transmission timing information may include {period}, {offset}, or {period, offset}. The reference transmission timing information may be respective to a specific DL CC (group) or UL CC (group), or may be used only for identifying the transmission timing information respective to the DL CC (group) or UL CC (group). The reference transmission timing information may be transmitted through a plurality of DL CCs, or may be transmitted through a single DL CC semi-statically or dynamically designated to a specific user equipment. The reference transmission timing information may be received through an RRC message.

Subsequently, the user equipment may use the reference transmission timing information received in step 1320, so as to identify (or verify) multiple transmission timing information for transmitting UCI (S1330). In this step, each transmission timing information respective to the UCI may be identified (or verified) for each DL CC (group) or UL CC (group). If the UCI is downlink channel information, each transmission timing information may be identified per DL CC (group). Each transmission timing information may be identified by uniformly modifying the reference transmission timing information received in step 1320 for each DL CC (group) or UL CC (group). Additionally, each transmission timing information may be identified by combining the reference transmission timing information received in step 1320 with additional information obtained on the corresponding DL CC (group) or UL CC (group). The additional information on the transmission timing may be explicitly signaled. For example, the additional information may be directly transmitted through multiple respective DL CCs or through one specific DL CC. The specific DL CC for transmitting the additional information may be semi-statically or dynamically designated. Also, the additional information may be received through an RRC message. The additional information may be received along with or separately from the reference transmission timing information. Furthermore, the additional information on the transmission timing may be implicitly signaled. For example, the additional information may be identified by using parameters respective to the corresponding DL CC (group). The parameters respective to the corresponding DL CC (group) may include bandwidth, CC (group) index, position in the frequency axis, and so on.

By identifying transmission timing information required for each DL CC (group) or UL CC (group) using the reference transmission timing information received in step 1320, in a situation where multiple DL CCs (or UL CCs) exist, the amount for signaling transmission timing of the UCI may be decreased. Also, by identifying required information for each DL CC (group) or UL CC (group) using the reference transmission timing information received in step 1320, the UCI related to each DL CC (group) or UL CC (group) may be prevented from being transmitted at the same point (e.g., subframe). Meanwhile, in case of a user equipment with no power limit, the single carrier characteristic is not required to be maintained. More specifically, it is possible to simultaneously transmit channel information through all (or a group) of the UL CCs. For example, by setting one or more offset values given with respect to the reference transmission timing for each DL CC (group) or UL CC (group) to '0' or to the same value, multiple control information may be transmitted via uplink.

Thereafter, the user equipment generates a UCI, and in accordance with the transmission timing identified in step 1330, the generated UCI may be transmitted to the base station through a respective UL CC among all UL CCs or a UL CC group (S1340). The UL CC transmitting the UCI may be mapped to a respective DL CC (group), or may correspond to a specific UL CC selected for transmitting the UCI.

Figure 14:
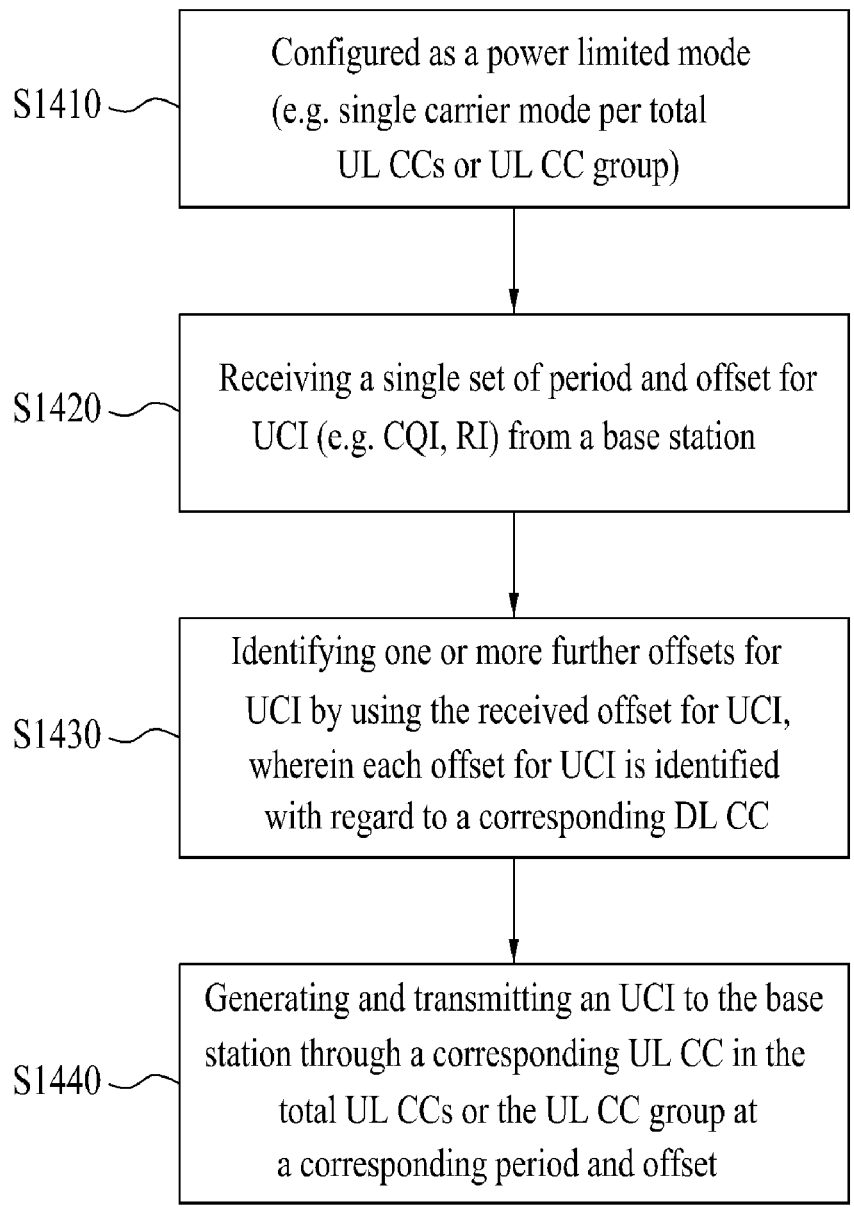
FIG. 14 illustrates a flow chart for transmitting control information according to an embodiment of the present invention.

FIG. 14 illustrates a flow chart showing the process steps of transmitting control information according to an embodiment of the present invention. The basic details of FIG. 14 are identical to those of FIG. 13. In this embodiment, it is proposed that only one set of {reference period, reference offset} with respect to control information transmission timing is to be notified, and that information on {additional offset} with respect to each CC (group) is to be signaled. The additional offset may be given as a relative value of the reference offset (i.e., relative offset) or may correspond to an absolute offset regardless of the reference offset. Thus, settings may be made so that the signaling amount for the control information transmission timing can be reduced, and so that control information can be transmitted via uplink at different points for each CC. In case of a downlink channel information, the transmission timing is signaled based upon the DL CC (group) and is identified for each DL CC (group). Hereinafter, a method for signaling transmission timing in accordance with the timing information will now be described in detail.

For example, as reference information on channel information transmission timing, a combination of {common period, reference offset} is signaled, and a relative offset value with respect to the reference offset for each DL CC (group) may be additionally signaled. For example, it is assumed that the relative offset values for DL CC0 and DL CC1 are given as n_offset,CC0 and n_offset,CC1. In this case, the channel information transmission timing for DL CC0 and DL CC1 may be respectively identified as {common period, reference offset+n_offset,CC0} and {common period, reference offset+n_offset,CC1}. This example will be described in more detail later on with reference to FIG. 15. Meanwhile, it is assumed that the absolute offset values for DL CC0 and DL CC1 are given as n_offset,CC0 and n_offset, CC1. In this case, the channel information transmission timing for DL CC0 and DL CC1 may be respectively identified as {common period, n_offset,CC0} and {common period, n_offset,CC1}.

In another example, by signaling the channel information transmission timing for one reference DL CC (group), and by signaling a relative offset value with respect to offset values of the reference DL CC (group) for the remaining DL CC (group), signaling overhead may be reduced more. The reference DL CC (group) may be pre-decided (e.g., DL CC (group) having the lowest (or highest) frequency band) or may be designated through signaling. For example, it is assumed that the reference DL CC is designated as DL CC0, and that the channel information transmission timing for the reference DL CC is given as {common period, offset_CC1}. It is also assumed that the relative offset value for DL C1 is given as n_offset,CC1. In this case, the channel information transmission timing for DL CC0 and DL CC1 may be respectively identified as {common period, offset_CC1} and {common period, offset_CC1+n_offset,CC1}. Meanwhile it is assumed that the absolute offset value for DL CC1 is given as n_offset,CC1. In this case, the channel information transmission timing for DL CC0 and DL CC1 may be respectively identified as {common period, offset_CC1} and {common period, n_offset,CC1}.

In yet another example, if the relative offset values of the remaining DL CCs or DL CC groups respective to the channel information transmission timing of the reference DL CC or DL CC group is constant, the signaling overhead may be further reduced by transmitting only one offset. More specifically, assuming a reference CQI transmission timing is represented as $T_{CQI,CC\_ref}(i)$, the $T_{CQI,CC\_ref}(i)$ may be defined as follows in case of FIG. 9. Herein, i represents an index transmitting channel information.

$$T_{CQI,CC\_ref}(i)=1,6,11,16,\ldots(i=0,1,2,3,\ldots) \quad \text{[Equation 1]}$$

As shown in Equation 1, when is decided, channel information transmission timing on a reference DL CC (group), only the common offset is transmitted for the remaining DL CC (group), thereby deciding channel information transmission timing for each DL CC (group). For example, it is assumed that transmission timing for a reference CC (group) is defined as $T_{CQI,CC\_ref}(i)$ and that n_offset has been transmitted as the common offset value for the other DL CCs or DL CC groups. In this case, the channel information transmission timing for each DL CC (group) may be defined as shown below.

$$T_{CQI,CC\_ref}(i)=T_{CQI,CC\_ref}(i)+n\_offset*j \quad \text{[Equation 2]}$$

Herein, $T_{CQI,CC\_ref}(i)$ represents channel information transmission timing that becomes a reference channel information transmission timing and may be decided as the channel information transmission timing of a reference DL CC (group). n_offset indicates a common offset for transmission timing, and j represents a DL CC (group) index (DL CCj). The reference DL CC (group) may be determined as the DL CC (group) having the lowest or highest frequency index or may be signaled separately. For example, it is assumed that, after a combination of {period '5', offset '1'} is signaled as the channel information transmission timing of a reference DL CC (group), '1' is signaled as the common offset (n_offset). In this case, the channel information transmission timing of all DL CCs or DL CC groups may be decided by the DL CC (group) index j and n_offset.

Figure 15:
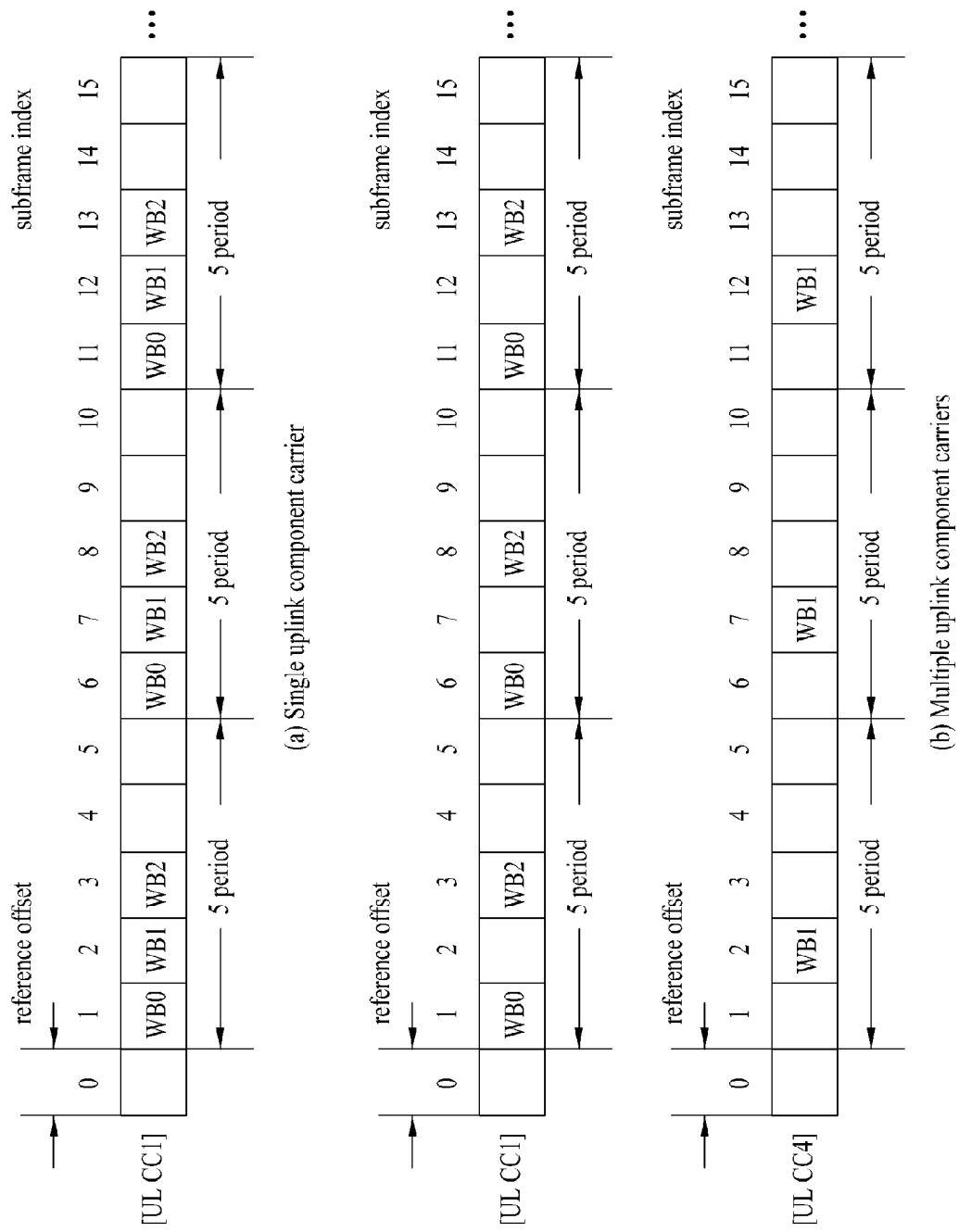
FIG. 15 illustrates an example of transmitting control information according to an embodiment of the present invention.

FIG. 15 illustrates an example of allocating channel information transmission timing so that the channel information transmission timing can be prevented from being overlapped for each DL CC, in a system where three (3) DL CCs (DL CC0~DL CC2) exist. Each DL CC can be replaced with a corresponding DL CC group.

Referring to FIG. 15, when three (3) DL CCs (DL CC0~DL CC2) exist, the user equipment may receive the combination of {common period '5', offset '1'} in step 1420. Also, the user equipment may additionally obtain n_offset,CC0=0, n_offset,CC1=1, n_offset,CC2=2 as the relative offset values for each DL CC. In this case, the user equipment may respectively set the channel information transmission timings of DL CC0~DL CC2 as {period '5', offset '1'}, {period '5', offset '2'}, and {period '5', offset '3'}, in step 1430. Thus, the user equipment may transmit only one channel information of each DL CC for each subframe. Accordingly, the user equipment may maintain the single carrier characteristic respective to the transmission signal. Meanwhile, the user equipment may additionally obtain n_offset,CC0=1, n_offset,CC1=2, n_offset,CC2=3 as the absolute offset values of each DL CC.

FIG. 15(a) illustrates a case where CQIs of DL CC0 to DL CC2 are transmitted only through UL CC1. This may occur during an asymmetrical carrier aggregation, or may be possible when UL CC1 is specifically designated so that channel information of multiple DL CCs can be transmitted. The UL CC for transmitting channel information may be designated through RRC signaling. FIG. 15(b) illustrates a case where CQIs of DL CC0 to DL CC2 are transmitted through multiple UL CCs (UL CC1 and UL CC4). In this case, the CQI may be transmitted through a UL CC mapped to the respective DL CC. For example, as shown in the drawing, the CQIs for DL CC0 and DL CC2 may be transmitted through UL CC1, and the CQI for DL CC1 may be transmitted through UL CC4. CQIs are transmitted through PUCCHs. However, if a PUSCH transmission exists at a point where the CQI is to be transmitted, the CQI may be transmitted through the PUSCH. FIG. 15 shows an example where only the WB CQI is transmitted. However, this is merely exemplary, and, therefore, simultaneous transmission channel information may be prevented by adjusting the transmission period and offset for each DL CC even when both WB CQI and SB CQI are transmitted, when CQIs and PMIs are both transmitted, and when RIs are transmitted.

The exemplary methods shown in FIG. 14 and FIG. 15 correspond to signaling methods where the channel information transmission timing of each DL CC (group) has the same period and different offset. However, when the frequency bands of each DL CC (group) are spaced largely apart from one another, the channel environment of each DL CC (group) may become completely different from one another. In this case, the period for transmitting the channel information on each DL CC (group) may be required to be set differently. Therefore, the present invention proposes a method of delivering reference transmission timing information to the user equipment and additionally transmitting information on the transmission period for each DL CC (group).

Figure 16:
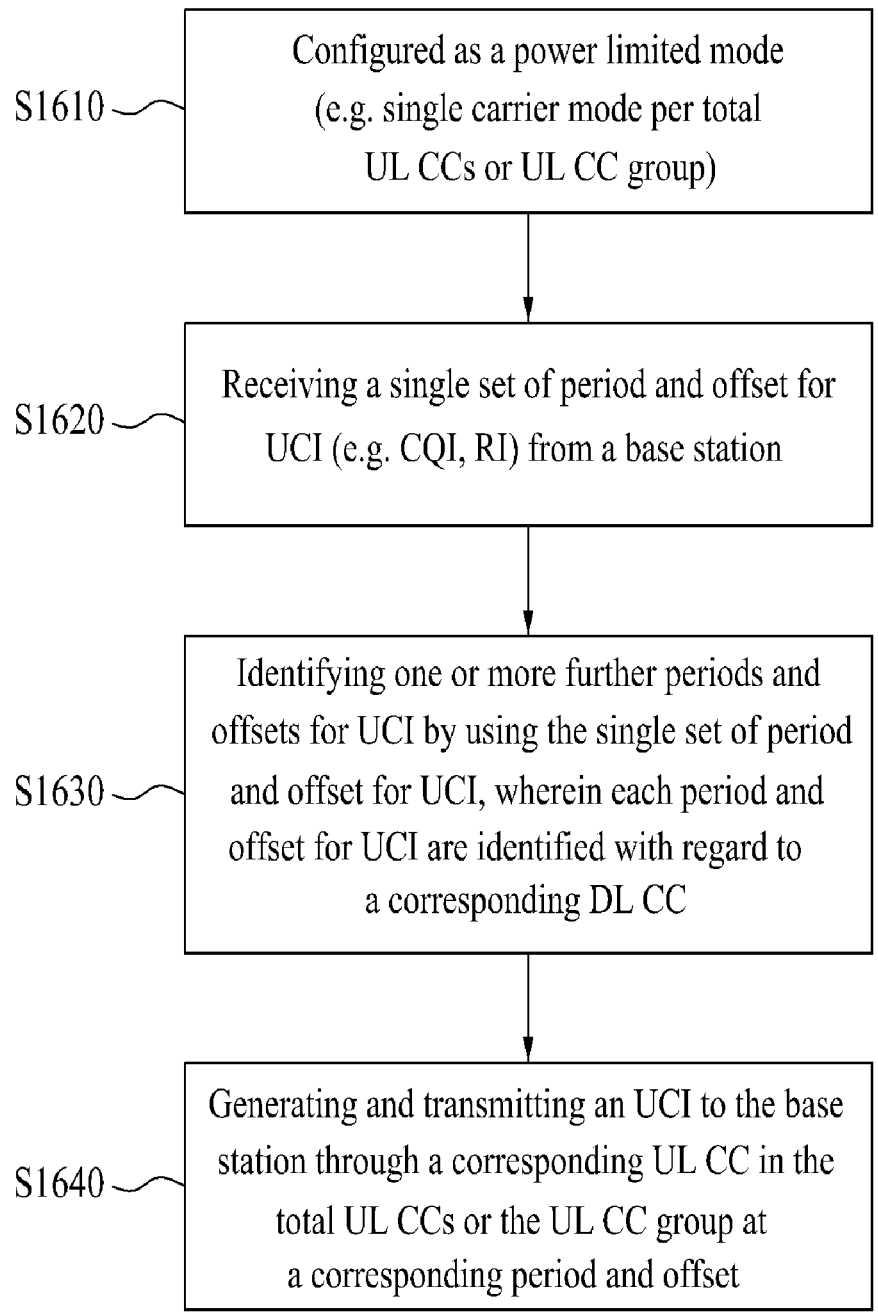
FIG. 16 illustrates a flow chart for transmitting control information according to an embodiment of the present invention.

FIG. 16 illustrates a flow chart showing process steps for transmitting control information according to an embodiment of the present invention. The basic details of FIG. 16 are identical to those described in FIG. 14 and FIG. 15. This embodiment of the present invention proposes a method of signaling only one set of {reference period, reference offset} in association with control information transmission timing, and signaling information related to {additional period} and {additional offset} for each DL CC (group). Thus, the signaling amount for the control information transmission timing may be reduced. An additional period may either be given as a relative value of the reference period (i.e., relative period) or be given as an absolute period regardless of the reference period. An additional offset may either be given as a relative value of the reference offset (i.e., relative offset) or be given as an absolute offset regardless of the reference offset. In this case, the additional information on each DL (group) may be given as a combination of {relative period, relative offset}, {absolute period, relative offset}, or {relative period, absolute offset}. Details on the additional offset are identical to those described in FIG. 14 and FIG. 15. As an example of the additional period, when the transmission period of the channel information for each DL CC (group) is required to be determined differently, the channel information transmission period for each DL (group) may be set as a multiple of the reference channel information transmission period (relative period). In this case, collision between channel information being transmitted at different period for each DL CC (group) may be prevented, and signaling overhead may also be reduced as compared to when separately (or differently) signaling period for each DL CC (group). Generally, when the reference channel information transmission timing is signaled as a value having the lowest period among the DL CCs or DL CC groups, there will be no problem if the period for each DL CC (group) set as its multiple. However, when the reference channel information transmission timing is decided as a value for a specific DL CC (group), it is difficult to determine that the channel information transmission timing of the specific DL CC (group) is the lowest. Therefore, the additional period may also be signaled as a fractional value. Meanwhile, the information on the additional period may be signaled by modifying the exemplary methods shown in FIG. 14 and FIG. 15.

Figure 17:
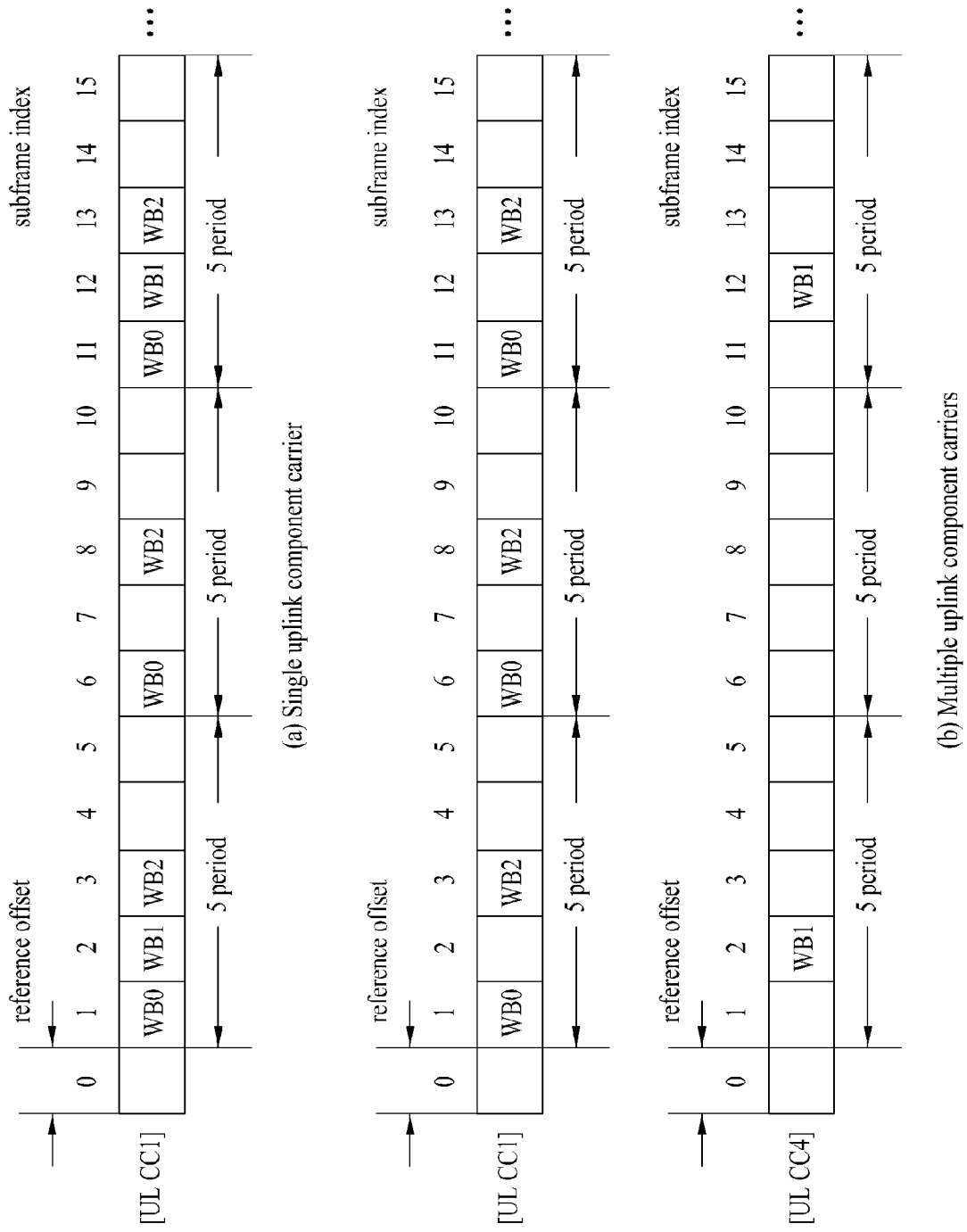
FIG. 17 illustrates an example of transmitting control information according to an embodiment of the present invention.

FIG. 17 illustrates an example of allocating channel information transmission timing, according to the method shown in FIG. 16, so that the channel information transmission timing can be prevented from being overlapped for each DL CC, in a system where three (3) DL CCs (DL CC0~DL CC2) exist. Each DL CC can be replaced with a corresponding DL CC group.

Referring to FIG. 17, when three (3) DL CCs (DL CC0~DL CC2) exist, the user equipment may receive the combination of {reference period '5', offset '1'} in step 1620. Also, the user equipment may additionally obtain n_offset,CC0=0, n_offset,CC1=1, n_offset,CC2=2 as the relative offset values for each DL CC. Also, the user equipment may additionally obtain information of multiplication times for the transmission period of the channel information for each DL CC relative to the reference period. For example, the channel information transmission period on DL CC0 and DL CC2 may be signaled as a one (1) time multiple, and the channel information transmission period on DL CC1 may be signaled as a two (2) time multiple. In this case, in step 1630, the user equipment may respectively set the channel information transmission timing for DL CC0~DL CC2 as {reference period×1 (=5), reference offset+n_offset,CC0 (=1)}, {reference period×2 (=10), reference offset+n_offset,CC1 (=2)}, {reference period×3 (=5), reference offset+n_offset,CC2 (=3)}. Meanwhile, the user equipment may additionally obtain information on an absolute period for transmitting channel information on each DL CC. In this case, the channel information transmission period on DL CC0 and DL CC2 may be signaled as 5, and the channel information transmission period on DL CC1 may be signaled as 10. Thus, the user equipment may transmit only one set of channel information of each DL CC for each subframe. Therefore, the user equipment may maintain the single carrier characteristic on the transmission signal. Meanwhile, when a PUSCH transmission carrying data at a point where the channel information is to be transmitted, the channel information may be transmitted through the PUSCH along with the data.

FIG. 17($a$) illustrates a case where CQIs of DL CC0 to DL CC2 are transmitted only through UL CC1. More specifically, the CQIs (WB0 to WB2) on DL CC0 to DL CC2 are respectively transmitted only through UL CC1 in conditions of {period 5, offset 1}$_{WB0}$, {period 10, offset 2}$_{WB1}$, {period 5, offset 3}$_{WB2}$ FIG. 17($b$) illustrates a case where CQIs of DL CC0 to DL CC2 are transmitted through multiple UL CCs (UL CC1 and UL CC4). More specifically, the CQIs (WB0 and WB2) on DL CC0 and DL CC2 are respectively transmitted through UL CC1 in conditions of {period 5, offset 1}$_{WB0}$ and {period 5, offset 3}$_{WB2}$ And, the CQI (WB1) on DL CC1 is transmitted through UL CC4 in the condition of {period 10, offset 2}$_{WB1}$. FIG. 17 shows an example where only the WB CQI is transmitted. However, this is merely exemplary, and, therefore, simultaneous transmission channel information may be prevented by adjusting the transmission period and offset for each DL CC even when both WB CQI and SB CQI are transmitted, when CQIs and PMIs are both transmitted, and when RIs are transmitted.

FIG. 18 illustrates an example for transmitting control information according to an embodiment of the present invention.

Referring to FIG. 18, the user equipment may transmit uplink control information in an $N^{th}$ subframe to the base station through a PUCCH of UL CC1. The uplink control information includes downlink channel information (e.g., CQI, PMI, RI). In this case, the downlink channel information being transmitted through the UL CC1 may be related to the DL CC (group) respective to the UL CC1. Also, if UL CC1 corresponds to a component carrier specifically designated for transmitting control information, the downlink channel information being transmitted through UL CC1, may be related to a DL CC (group) non-associated to UL CC1. Thereafter, the user equipment may be able to transmit control information to an $M^{th}$ subframe through UL CC3 in accordance with a pre-decided order. If it is assumed that PUSCH transmission for data exists in the UL CC1 at the same point, the user equipment may transmit control information, which was anticipated to be transmitted through UL CC3, through the PUSCH of UL CC1 along with the data. In case the control information corresponds to downlink channel information, the control information being transmitted through the PUSCH of UL CC1 corresponds to channel information respective to a DL CC (group) associated with UL CC3 and not UL CC1.

The above description mainly focuses on channel information and, more particularly, to CQI. However, the embodiment of the present invention may also be easily applied in cases where the RI is transmitted. For example, by signaling a combination of a reference period for RI transmission (e.g., multiple of the CQI transmission period) and an offset, and by signaling additional offset values for each CC (group), collision of RI transmission timing between each CC (group) may be prevented, and signaling overhead may be reduced. Also, in order to set the RI transmission period differently for each CC (group), a reference period for transmitting RIs may be signaled, and a multiple or fractional value of the reference period may be signaled for each CC (group). In this case, the lowest RI transmission period may be set as the reference period, and only multiples of the reference period for transmitting RIs may be signaled.

FIG. 19 illustrates exemplary base station and user equipment that can be applied to the embodiment of the present invention.

Referring to FIG. 19, a wireless communication system includes a base station (BS) 110 and a user equipment (UE) (or terminal) 120. In a downlink, a transmitter corresponds to a portion of the base station 110, and a receiver corresponds to a portion of the UE 120. In an uplink, a transmitter corresponds to a portion of the UE 120, and a receiver corresponds to a portion of the base station 110. The base station 110 includes a processor 112, a memory 114, and a radio frequency (RF) unit 116. The processor 112 may be configured to embody the procedures and/or methods proposed in the present invention. The memory 114 is connected to the processor 112 and stores diverse information associated with the operation of the processor 112. The RF unit 116 is connected to the processor 112 and transmits and/or receives a radio signal. The UE (or terminal) 120 includes a processor 122, a memory 124, and an RF unit 126. The processor 122 may be configured to embody the procedures and/or methods proposed in the present invention. The memory 124 is connected to the processor 122 and stores diverse information associated with the operation of the processor 122. The RF unit 126 is connected to the processor 122 and transmits and/or receives a radio signal. The base station 110 and/or the UE 120 may have a single antenna or multiple antennae.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as terminal, mobile station (MS) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention may be applied to a wireless communication system. More specifically, the present invention may be applied to a method and apparatus for controlling transmission power for multiple signals.

The invention claimed is:

1. A method of transmitting uplink control information from a user equipment (UE) in a wireless communication system, the method comprising:
   receiving, from a base station (BS), first transmission timing information for transmitting first control information associated with one or more first downlink component carriers;
   receiving, from the BS, an additional time offset,
   wherein the first transmission timing information includes a transmission period and a time offset for transmitting the first control information;
   determining second transmission timing information for transmitting second control information associated with one or more second downlink component carriers by modifying the time offset included in the first transmission timing information based upon the additional time offset; and
   transmitting, to the BS, the second control information associated with the one or more second downlink component carriers in dependence upon the second transmission timing information,
   wherein the second transmission timing information includes the transmission period and the modified time offset for transmitting the second control information.

2. The method of claim 1, wherein the additional time offset indicates a relative value being dependent on the time offset included in the first transmission timing information or an absolute value being independent from the time offset included in the first transmission timing information.

3. The method of claim 1, wherein the additional time offset is obtained by using a parameter associated with the one or more second downlink component carriers.

4. The method of claim 1, wherein the second transmission timing information is determined so that the first control information and the second control information are prevented from being transmitted simultaneously.

5. The method of claim 1, wherein the first control information and the second control information are transmitted to the base station through the same uplink component carrier.

6. A user equipment (UE) of a wireless communication system, the UE comprising:
a radio frequency (RF) unit being configured to transmit and receive wireless signals to and from a base station (BS);
a memory storing information being transmitted and received to and from the BS and parameters required for performing operations of the user equipment; and
a processor connected to the RF unit and the memory, and being configured to:
control the RF unit and the memory, so as to operate the UE,
receive, from the BS, first transmission timing information for transmitting first control information associated with one or more first downlink component carriers,
receive, from the BS, an additional time offset, wherein the first transmission timing information includes a period and a time offset for transmitting the first control information,
determine second transmission timing information for transmitting second control information associated with one or more second downlink component carriers by modifying the time offset included in the first transmission timing information based upon the additional time offset, and
transmit, to the BS, the second control information associated with the one or more second downlink component carriers in dependence upon the second transmission timing information,
wherein the second transmission timing information includes the transmission period and the modified time offset for transmitting the second control information.

7. The user equipment of claim 6, wherein the additional time offset indicates a relative value being dependent on the time offset included in the first transmission timing information or an absolute value being dependent from the time offset included in the first transmission timing information.

8. The user equipment of claim 6, wherein the additional time offset is obtained by using a parameter associated with the one or more second downlink component carriers.

9. The user equipment of claim 6, wherein the second transmission timing information is determined so that the first control information and the second control information are prevented from being transmitted simultaneously.

10. The user equipment of claim 6, wherein the first control information and the second control information are transmitted to the base station through the same uplink component carrier.

* * * * *